United States Patent [19]

Adachi

[11] Patent Number: 5,524,018

[45] Date of Patent: Jun. 4, 1996

[54] SUPERIOR RESOLUTION LASER USING BESSEL TRANSFORM OPTICAL FILTER

[76] Inventor: Yoshi Adachi, 16214 Watson Cir., Westminster, Calif. 92683

[21] Appl. No.: 288,700

[22] Filed: Aug. 12, 1994

Related U.S. Application Data

[63] Continuation-in-part of Ser. No. 130,884, Oct. 4, 1993.

[51] Int. Cl.[6] ............................................. H01S 3/08
[52] U.S. Cl. ..................................... 372/98; 372/102
[58] Field of Search ........................... 372/98, 99, 103, 372/102

[56] References Cited

U.S. PATENT DOCUMENTS 3,247,467  4/1966  Geusic et al. ......................... 372/103
4,498,184  2/1985  O'Meara ............................... 372/99

*Primary Examiner*—Leon Scott, Jr.
*Attorney, Agent, or Firm*—James T. English

[57] ABSTRACT

A fraction of the theoretical spot size in a lens system is obtained by applying a filter consisting of a variable pitch circular grating, in front of the focus lens. The focal point Image of a lens is a spot called an Airy disk. The diameter of the Airy disk is proportional to (wavelength)/(Numerical Aperture). Numerical aperture is equal to (½ of the diameter of the lens)/(focal length). This is the theoretical limit of spot size. Using a Bessel Transform, modified circular grating, filter the resulting first and higher order diffraction images lie on the optical axis and interfere resulting in a small beam spot at the focus surrounded by interference bands, producing a narrowed zero order beam for projection in optical and infrared applications.

9 Claims, 3 Drawing Sheets

SUPERIOR RESOLUTION LASER USING BESSEL TRANSFORM OPTICAL FILTER

REFERENCE TO PRIOR APPLICATIONS

This patent application is a Continuation in Part of a previously filed application, Ser. No. 08/130,884 for: Laser Edge Diffraction Density Filter which was Filed Oct. 4, 1993 by the same inventive entity.

BACKGROUND OF THE INVENTION

1. Field of the Invention

The invention relates to laser beam generating apparatus and more particularly to light beam sources having minimal diameters for optical recording, laser printing, fiber optic communications, microetching, and the like.

2. Description of the Prior Art

The optical spot made by a lens with a circular aperture is well known and described in the literature such as:

Born and Wolf, "Principles of Optics"; Permagon Press, New York 1964, pg 395.

Hecht and Zajac, "Optics"; Addison Wesley, Menlo Park, Calif. pg 350.

A prior patent to Adachi is also related; U.S. Pat. No. 5,321,717 provides an optical element structure for reducing beam spot size. However, the search for even smaller light beam spot size is fruitful in data recording/transmission by compact disk and other media since the resolution, and thus the total amount of data that can be stored in a given area, can be greatly increased in relation to the decrease in spot size.

The optical spot made by a lens with a circular aperture is:

$$I(p) = \left\{ \frac{2 J1(kaw)}{kaw} \right\}$$

The intensity distribution $I(p) = \{U(p)\}$

J1 is a Bessel function of the 1st kind and the 1st zero is 3.83. $k = 2\pi/(\text{wavelength})$, a is a radius of aperture and can be replaced by NA (numerical aperture $(a/fl)$ where fl is focal length w is a distance from the center of the image.
Then $kaw = 3.83$ $$a = \frac{3.83}{k\,NA} = \frac{3.83(\text{wave length})}{2\pi NA} = 0.61\,\mu m$$

Where wavelength=0.65 μm, Diode laser visible red,
NA=0.65 possible largest NA with long working distance. The spot size is 2a=1.2 μm. This will be smaller for shorter wave length and larger NA. However, both requirements are faced to the limit. Even with future improvement, spot size is limited to 1 μm.

If an ultraviolet laser is to be used, the instrument will be heavy and bulky, and the lens no longer able to use optical glass of high refractive index: and the NA will be smaller by 0.4.

The theoretical limit of resolution is the laser wavelength. If the wavelength, in the case of a diode laser, is 630 to 780 nanometers: for example 633 nanometers. proportionately, using a shorter wavelength beam, such as an Argon laser beam which has a 460 nanometer wavelength, then a spot less than 400 nanometers is obtained, which is much smaller than what is currently being used in Integrated Circuit (IC) processing by photoetching.

Scanners for photoetching functions advantageously are moving to the use of diode lasers instead of Argon lasers now in use. The Argon laser is prohibitively expensive since external modulators must be used resulting in very high equipment costs. By using diode lasers, modulation capability is intrinsic in the design, and the longer wavelength, contrasted with the Argon laser, can be compensated by use of the novel Bessel Transform circular grating optical filter of the invention, to obtain the high resolution beam spot equivalent to use of the Argon laser.

Use of the novel filter in combination with the diode laser is an inexpensive method for obtaining the high resolution 1600 lines per inch required for Integrated Circuit scanners and other high resolution applications over 600 lines per inch.

Accordingly, it is a primary object of the invention to provide a means for reducing laser beam spot size to increase the resolution of the beam particularly for applications requiring resolution of upwards of 600 lines per inch. Such applications exist in laser printing, and in manufacturing of Integrated Circuits, by high resolution photo etching wherein using shorter wavelength lasers such as the Argon laser to obtain higher resolution may be cost prohibitive.

It is another object of the invention to provide a general solution to beam spot size reduction that is easily accomplished by a simple filter that can be added to existing optics systems to provide nominally 30 percent reduction in spot size at any laser wavelength. For example the Argon Laser has half the wavelength of conventional diode lasers, and a beam spot size of one micron. If the novel filter is used with an Argon laser, an even smaller spot can be obtained. The micron beam diameter can be made smaller by thirty percent or 0.7 micron.

Yet another object of the invention is to provide a resolution enhancing filter that can be accurately and inexpensively produced by photo-resist methods. The geometry of the novel Bessel order circular grating filter is easily accomplished by making calculations to determine the Bessel order ring diameters, and etching a substrate using normal photoresist techniques to make one master. The master can be large; i.e., the size of the numerical aperture in the associated system optics since the novel filter is positioned before the focus or imaging optics. The master can be duplicated for any laser system application requiring resolution of 1600 lines per inch such as IC photoetching scanners, or lesser requiremnents such as 300 to 600 lines per inch in laser printers.

BRIEF DESCRIPTION OF THE INVENTION

In accordance with the invention, a method and means is provided to obtain a fraction of the Airy disk spot size using a simple filter placed before the focus of a lens in an optic system. The filter is made of optical glass; e.g., BK7 polished plane parallel, with one side including a circular grating having a periodicity that is non-constant, thereby preventing overlap of the first order diffraction rings at one spot location, but instead, causing separation along the optical axis. The zero order spots are allowed to overlap, and multitple interference occurs at higher orders, resulting in a reduced size small spot and displaced higher order diffraction rings.

DETAILED DESCRIPTION OF THE INVENTION

The optical small spot cross section of a light beam is used in laser printer and digital memory disk technologies. The smaller the spot, the better the resolution and therefore the more information that can be stored in a given area.

The optical small spot obtained by projecting a light beam through an imaging lens is the so called Airy disk described in the literature. The intensity distribution of a point source image is expressed by $$I(p) = \{U(p)\}^2$$

where $$U(p) = \left\{ \frac{2 J1(kaw)}{kaw} \right\}$$

$$w = \frac{3.83}{k\,NA} = \frac{3.83\,\lambda}{2\pi NA} = 0.61\,\mu m$$

To make w small, it is necessary to make NA larger and to use shorter wavelength.

With wavelength=0.65 μm, and NA=0.65, then w=0.61 μm. The diameter of the Airy disk is 1.2 μm. This is almost the limit. If the wavelength is shortened to 0.3 μm which is not obtainable today, available glass is limited to low refractive index glass and NA will be 0.4 which is inferior to a visible laser.

The essence of this disclosure is to apply a circular grating with variable spatial frequency at the front of a lens as a filter to obtain a small spot less than ½ of the Airy disk. The filter makes various orders of diffraction images along the optical axis interfere with each other and, at the Bessel zero order position, form a small spot of reduced size over the Airy disk spot size.

An example of a variable amplitude circular grating is $$A(r) = 1 + \cos\{2\pi N(r + r^2)\} \quad \text{Eq1}$$

r is a radius of the pupil normalized.
N is a number and is not limited to integers
The disturbance at image p is $$U(p) = C \int_0^1 A(r)\, J0(vr)\, r\, dr \quad \text{Eq 2}$$

Where J0 is a Bessel function of the 0 order.

v = k NA r

NA is a numerical aperture=a/f, and the intensity distribution is obtained:

$$I(p) = U(r)\, U(r)^* \quad \text{Eq3}$$

The novel non-uniform pitch circular grating operates according to Eq. 2 and the filter is therefore called a Bessel Transform Filter.

Figure 1:
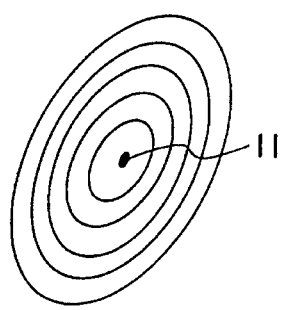
FIG. 1 is a drawing showing the Airy disk, well known in optics practice illustrating the zero order spot and diffraction rings for five higher orders.
Figure 2:
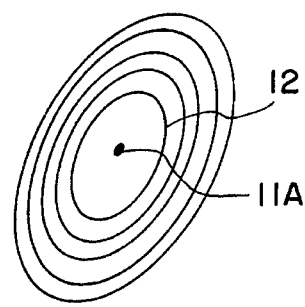
FIG. 2 is a drawing illustrating the narrowed spot and the displacement of the n-order diffraction rings when a non-uniform pitch circular grating filter is used.

When a lens is faced to a collimated beam, a spot is formed called an Airy disk as shown in FIG. 1. Then, a filter having a non-uniform period circular grating inscribed thereon is located in front of the lens resulting in various diffracted images formed along the optical axis as shown in FIG. 2. Those beams interfere with each other and at the Bessel zero order image position, a spot is observed, which is much smaller than the Airy disk, surrounded by the diffracted images. The 0-order beam 11A is much smaller than the diffracted beam 12.

The equation (2) is only for the zero order beam, the diffracted beams have to be added, translating filter function Eq 1 into aberration function and intensity. The first order term may be:

$$2A1 \cos(a1\, r^2 + \text{higher order})$$

The second order term:

$$2A2 \cos(2a1\, r^2 + \text{higher order})$$

If the profile of the circular grating made is more square wave, the ratio of coefficients Ai have to be measured experimentally and fed back to the equation. The calculations to simulate the practical spot is very complicated. The empirical experimental observation and improvements were most effective.

Eq 2 is for an Amplitude filter. For a Phase filter A(r) is replaced by exponential A(r)

$$\int e^{\frac{-2\pi}{\lambda}}\, A(r)$$

EXAMPLE

For a lens focal length mm, diameter=15 mm, F/10 and NA=0.05, and a diode laser: wavelength=0.68 μm, When mean period p=0.33 mm, N=22.7, the pupil coordinate is normalized dividing by radius of pupil 15/2=7.5 p0=0.044. The Equation (3) obtains coordinates of A(r)=0 as in TABLE 1.

TABLE 1

Radial Coordinates of A(r) = 0

| Bessel Order # | Radius r |
| --- | --- |
| 1 | 0.0422 |
| 2 | 0.1182 |
| 3 | 0.1857 |
| 4 | 0.2472 |
| 5 | 0.3040 |
| 10 | 0.5426 |
| 20 | 0.9029 |
| 23 | 0.9941 |

Figure 3:
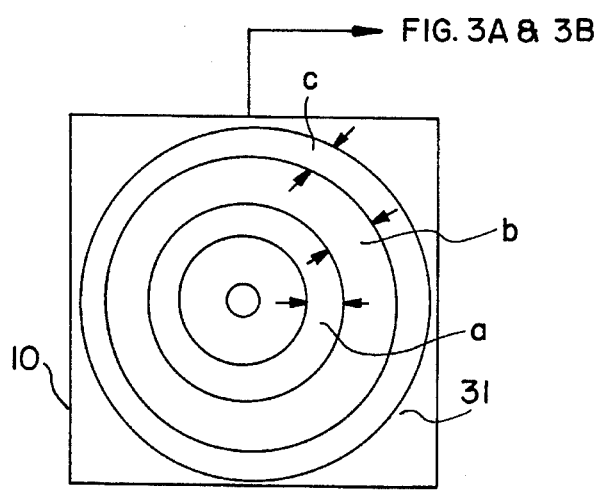
FIG. 3 is a front view of the circular grating filter showing the non-linear period of the filter.
Figures 3A, 3B:
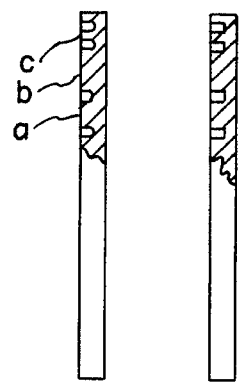
FIGS. 3A and 3B are partial cross sectional views of the filter illustrating the rounded grooves and the square cornered grooves respectively.

The change of grating pitch from the center to the edge is shown in FIG. 3. Distances a, b, and c, for example, are not equal. To make the circular grating 7.5 is multiplied to normalized coordinates. The period change is from 0.57 to 0.224 mm. A plane polished glass is ruled using a computer controlled machine and etched. When the valley is blackened, an Amplitude Filter is obtained.

When a proper degree of etching is timed, a Phase Filter is obtained.

The experimental setup laser spot size observed was 14 µm without the filter, and 5 µm with the filter; i.e., about ⅓ of the Airy disk spot. The phase filter results in a brighter spot but it is more critical in etching time. It was found also that the shape of the grating lines promotes the higher order terms when square rather than when sinusoidal.

The flare area is extended to outer zones.

For the Phase Grating, the calculation is changed to $$U(p) = C \int_0^1 JO(vr) \exp(-iur/2) \exp\{i\,A(r)\}\, r\, dr \qquad \text{Eq 4}$$

Figure 4:
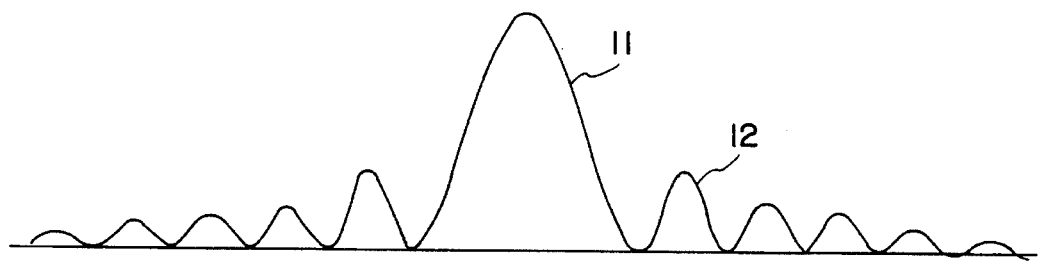
FIG. 4 is a drawing depicting the intensity distribution without the novel filter, which is a typical Airy disk distribution of the zero and higher orders.
Figure 4A:
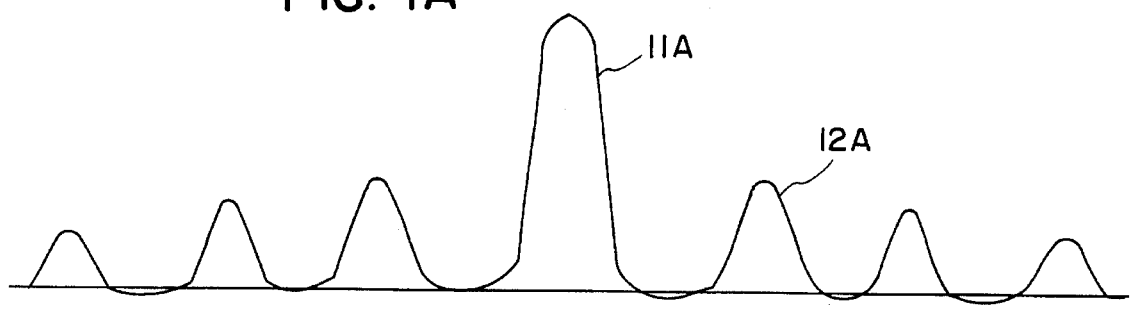
FIG. 4A is a drawing depicting the narrowed zero order intensity and the higher order distribution of the laser output when the filter is used, relative to a curve FIG. 4 of intensity distribution without the filter.

FIG. 4 is a drawing depicting the intensity distribution without the novel filter, which is a typical Airy disk distribution of the zero 11 and higher orders 12. FIG. 4A is a drawing depicting the narrowed zero order 11A intensity and the higher order distributions e.g. 12A of the laser output when the filter is used, relative to the curve, FIG. 4 of distribution without the filter 10. It will be noted that the zero order spot intensity 11 and 11A are about the same but the beam spot with the filter is narrower and the first order diffraction rings 12 and 12A are displaced due to the interaction of the normal Airy disk and the filter distributions.

Figure 5:
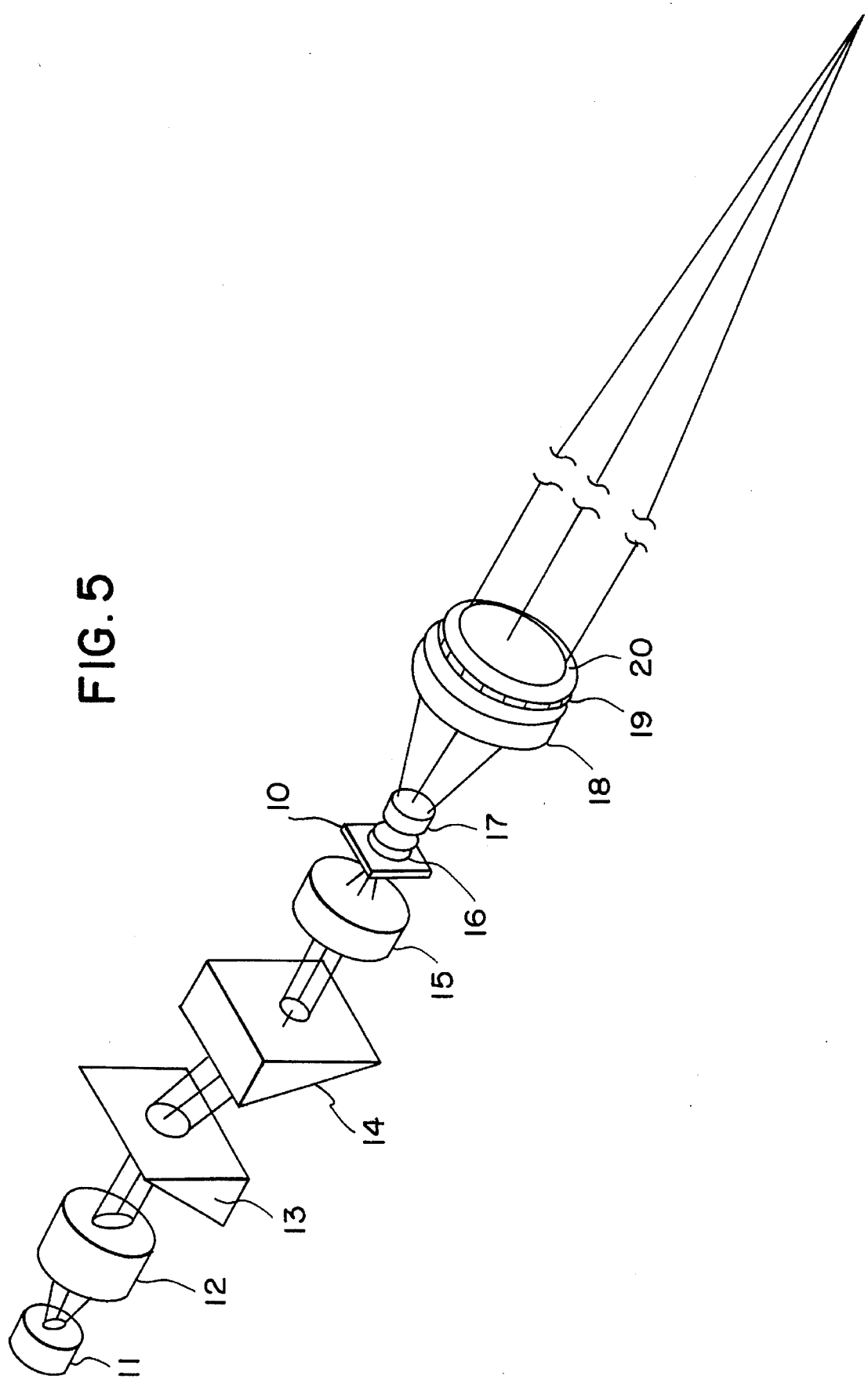
FIG. 5 is a drawing of one embodiment of the invention which shows the novel combination of a diode laser optical system in the parent case into which is placed the circular grating filter for decreasing the size of the beam spot and providing a long focal length optical system for a laser printer application.

Referring now to FIG. 5, the novel circular grating filter 10 is shown installed in the invention disclosed in the parent case of this Continuation in Part Application entitled LASER EDGE DIFFRACTION PATTERN DENSITY FILTER.

A typical diode laser's light emitting characteristic is shown in FIG. 5. The emitting diode 11 wavelength is 670 nm, the beam divergence is 20 degrees perpendicular to the junction and 10 degrees parallel to the junction. At 0.4 intensity they are 10 and 5 degrees respectively and the inside of this beam is used to obtain flat illumination. The outside of the beam is masked out. The beam is then collimated with a small lens 12, numerical aperture NA=0.2. A graded index rod lens with 3 mm diameter or a Selfoc lens may be used. The graded index rod lens is a cylindrical lens having flat surfaces on both ends, and a parabolic graded index of refraction formed by a process of ion implantation. The collimated beam enters the beam shaper, made up of prisms 13, 14. The second graded index lens 15 converges the round beam from the beam shaper to a point X from which it diverges and is expanded in the Gaussian beam corrector. The corrector consists of two lens groups. The first group 16, 17, expands the 10 degree beam to 20 degrees and beam shapes to flat illumination at the second group 18, 19. The second group lens compensates the aberration introduced by beam shaping and emits a perfectly collimated beam having no diffraction pattern because of the filter coating 20 on the lens 19. Therefore the combination, with the Bessel Transform filter 10, provides a uniform intensity, non-Gaussian less than one micrometer in diameter beam having no aberration or halo effects. Such a beam is desirable for applications in laser printers and high precision optical apparatus requiring long focal length.

Figure 6:
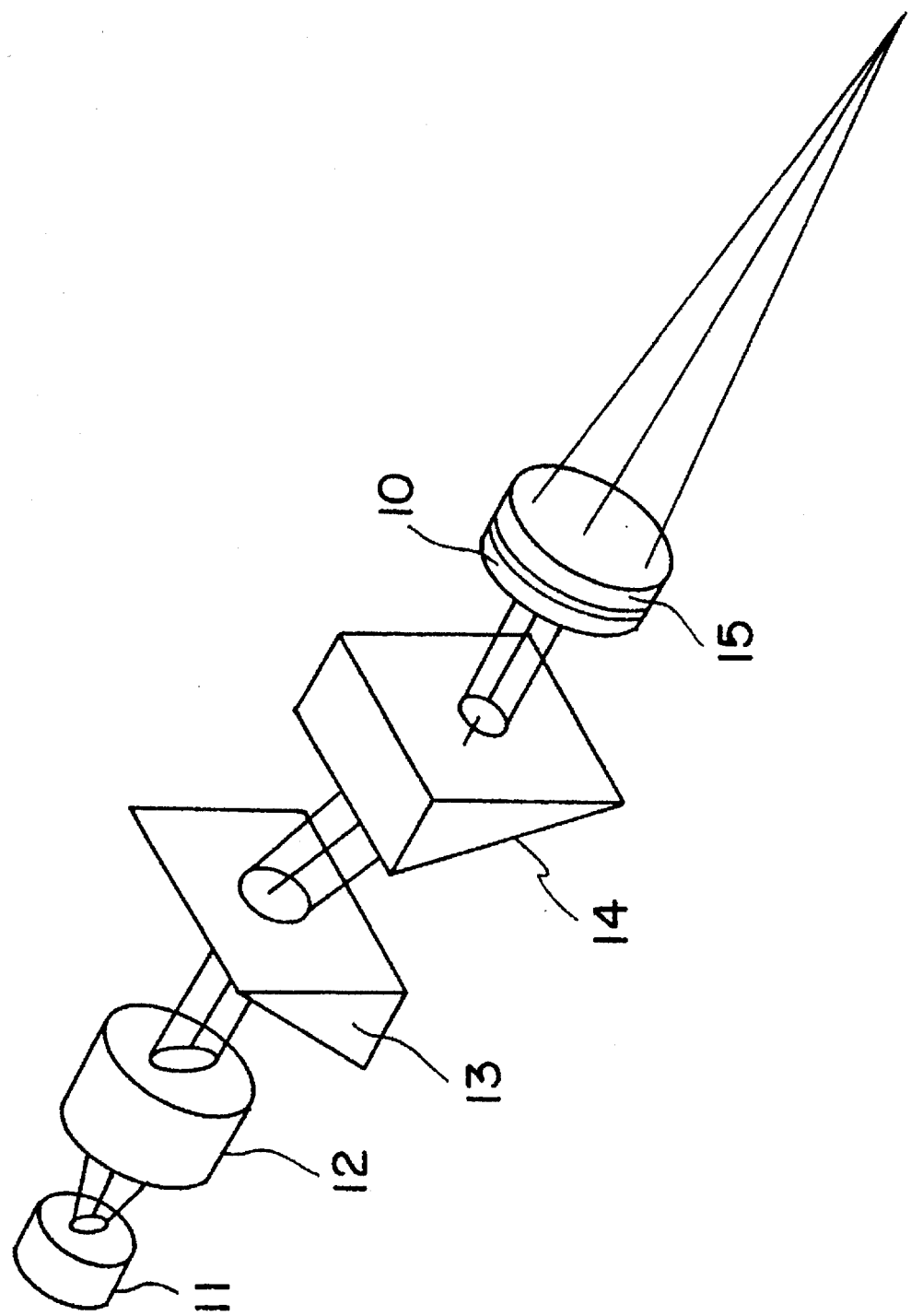
FIG. 6 is a drawing of another embodiment of the invention which shows the novel combination of a diode laser optical system in the parent case into which is placed the circular grating filter for decreasing the size of the beam spot and providing a short focal length optical system for a Compact Disk or fiber optic application.

FIG. 6 shows the same setup as FIG. 5, truncated at the corrector group 16, 17, which expands the 10 degree beam to 20 degrees and then focuses it for a simpler application in CD technology at about three and a half inches focal length where no edge filtering nor uniform intensity distribution is required.

While the preferred embodiments of the present invention have been described hereinabove, it is intended that all matter contained in the above description and shown in the accompanying drawings be interpreted as illustrative and not in a limiting sense and that all modification, constructions, and arrangements that fall within the scope and spirit of the invention be considered as having been made.

What is claimed is:

1. An optical filter for causing interference of Bessel Transform non-zero order diffraction bands with a laser radiation beam to reduce zero order beam spot size, increasing laser beam resolution, said filter comprising:

a substrate, substantially planar, transmissive at wavelengths of laser radiation;

a circular grating having non-uniformly spaced rings inscribed in said substrate, for receiving and transmitting laser beam radiation therethrough, said rings spaced apart in accordance with Bessel Transform zero and higher orders;

imaging optics means receiving laser radiation transmitted through said circular grating, focusing, and imparting zero and higher order Bessel Transform beams to said laser beam radiation, producing non-uniformly spaced interference bands imposed on said laser radiation;

whereby first and higher order Bessel diffraction bands interfere and are radially outwardly displaced in said radiated laser beam, producing a reduced zero order beam spot size.

2. An optical filter as described in claim 1 wherein said circular grating is composed of square-corner grooved rings in said substrate, whereby first and higher Bessel order amplitude diffraction bands are enhanced over rounded grooves.

3. A laser beam radiation source having a round beam cross sectional spot size a fraction of a micrometer in diameter, which comprises:

a diode laser emitting an ellipse shaped beam;

corrective optics means receiving the emitted beam from said diode laser, providing a collimated, circular beam;

an optical filter having a non-uniform period circular grating, receiving the collimated circular beam from said diode laser and imparting diffraction bands to the collimated circular beam, transmitting a filtered collimated circular beam therethrough;

imaging optics means receiving the filtered collimated circular beam and interfering non-zero Bessel orders of the emitted beam, and transmitting Bessel zero order beam;

whereby said zero order beam is spaced apart from non-zero order beams reducing zero order beam spot size and increasing resolving power of the beam.

4. A laser beam radiation source having a spot size a fraction of a micrometer as described in claim 3, wherein said optical filter having a non-uniform period circular grating has a periodicity expressed by the equation $$A(r)=1+\cos\{2\pi N(r+r^2)\}+\text{non-zero Bessel orders}$$

where r is a normalized radius of the grating and N is any number.

5. A laser beam radiation source having a spot size a fraction of a micrometer as described in claim 3 wherein said optical filter is an amplitude filter consisting of inscribed and inked circular grooves in said substrate.

6. A laser beam radiation source as described in claim 3 wherein said optical filter is a phase filter consisting of heavily etched circular rings on a lightly etched substrate.

7. In a diode laser optical system of the type wherein a diode emits a radiated beam at a wavelength in the 500 nanometers to 2 micrometer range, and an optical system of lenses shapes the intensity pattern of the beam, the improvement which comprises:

a Bessel Transform circular grating optical filter placed in the beam for causing interference of the non-zero order diffraction patterns along the optical axis, whereby the Bessel non-zero order beams are spaced apart from the zero order beam, isolating the zero order beam, thereby decreasing the beam spot diameter and increasing resolving power of the beam.

8. In a junction diode laser and optical system having an emitting wavelength in the nanometer range and an elliptical shaped beam, the beam divergence being about 20 degrees perpendicular to the diode junction along the optical axis and 10 degrees parallel to the diode junction, and having a Gaussian intensity distribution; the improvement for correcting the Gaussian beam intensity distribution to flat distribution, and producing a narrowed beam of less than 1 micrometer along the optical axis, which comprises:

a first graded index of refraction lens collimating the diode beam along the optical axis;

a beam shaper receiving the collimated beam from said graded index lens, producing a round beam from the elliptical diode beam;

a second graded index of refraction lens receiving the round beam from said beam shaper and producing a beam focused to a convergence point;

a Bessel Transform grating optical filter placed in the beam for generating high order interference and displacing the non-zero order diffraction patterns along the optical axis, leaving only the zero order beam thereby decreasing the cross sectional beam diameter;

a Gaussian beam corrector and collimator consisting of a first compound lens including a meniscus lens receiving the beam from said second graded index rod lens from the convergence point and expanding the beam;

a second compound lens, including a meniscus lens and an objective lens, receiving the expanded beam from said first compound lens;

whereby the converged beam compensates aberration introduced by beam shaping, the first compound lens expands the beam and the second compound lens emits an expanded, collimated beam having uniform intensity distribution and less than 1 micrometer beam diameter, and the objective lens has a focal length selectable for specific applications.

9. An optical filter for causing interference of Bessel Transform non-zero order diffraction bands in a laser radiation beam to reduce zero order beam spot size, increasing laser beam resolution, said filter comprising:

a substrate, substantially planar, transmissive at wavelengths of laser radiation;

a circular grating having non-uniformly spaced rings inscribed in said substrate, for receiving and transmitting laser beam radiation therethrough, said rings spaced apart in accordance with Bessel Transform zero and higher orders;

whereby first and higher order Bessel diffraction bands interfere and are radially outwardly displaced in said radiated laser beam, producing a zero order beam spot size reduced by about 30 percent.

* * * * *